United States Patent
Herz et al.

(10) Patent No.: US 7,225,619 B2
(45) Date of Patent: Jun. 5, 2007

(54) METHOD FOR OPERATING AN INTERNAL COMBUSTION ENGINE HAVING AN EXHAUST-GAS TURBOCHARGER

(75) Inventors: Klaus Herz, Flein (DE); Helge Frauenkron, Burscheid (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 11/022,918

(22) Filed: Dec. 21, 2004

(65) Prior Publication Data

US 2005/0160732 A1   Jul. 28, 2005

(30) Foreign Application Priority Data

Jan. 28, 2004   (DE) ............... 10 2004 004 171

(51) Int. Cl.
*F02D 23/00* (2006.01)
*F02B 33/44* (2006.01)

(52) U.S. Cl. ............................. 60/602; 60/605.1

(58) Field of Classification Search ............ 60/602, 60/605.1
See application file for complete search history.

(56) References Cited

U.S. PATENT DOCUMENTS

| | | | | |
|---|---|---|---|---|
| 5,121,604 A | * | 6/1992 | Berger et al. | 60/602 |
| 5,431,008 A | * | 7/1995 | Ross et al. | 60/803 |
| 5,442,918 A | * | 8/1995 | Baeuerle et al. | 60/602 |
| 6,148,615 A | * | 11/2000 | Vogt et al. | 60/602 |
| 6,543,227 B2 | * | 4/2003 | He et al. | 60/602 |
| 6,782,877 B2 | * | 8/2004 | Nau et al. | 60/612 |
| 6,928,817 B2 | * | 8/2005 | Ahmad | 60/602 |
| 2004/0011340 A1 | * | 1/2004 | Hosny et al. | 123/559.1 |

FOREIGN PATENT DOCUMENTS

| | | | |
|---|---|---|---|
| DE | 3129686 A | * | 2/1983 |
| FR | 2868473 A1 | * | 10/2005 |

* cited by examiner

*Primary Examiner*—Thai-Ba Trieu
(74) *Attorney, Agent, or Firm*—Kenyon & Kenyon LLP

(57) ABSTRACT

A method for operating an internal combustion engine having an exhaust-gas turbocharger allows for an optimized charge air pressure buildup. For this purpose, an actuator for influencing the charge air pressure generated by a compressor of the exhaust-gas turbocharger is triggered. A characteristic of a trigger signal of the actuator is specified as a function of time.

9 Claims, 3 Drawing Sheets

METHOD FOR OPERATING AN INTERNAL COMBUSTION ENGINE HAVING AN EXHAUST-GAS TURBOCHARGER

BACKGROUND INFORMATION

Methods for operating an internal combustion engine having an exhaust-gas turbocharger are already known. For this purpose, an actuator for influencing the charge air pressure generated by a compressor of the exhaust-gas turbocharger is triggered. This actuator is normally a bypass valve in a bypass, which bypasses the turbine of the exhaust-gas turbocharger or the compressor of the exhaust-gas turbocharger. The actuator, however, may also be an actuator for varying the geometry of the turbine of the exhaust-gas turbocharger.

Exhaust-gas turbochargers having such a variable turbine geometry are currently widely used to achieve a significant increase in the performance of the internal combustion engine. Compared to conventional exhaust-gas turbochargers featuring a bypass valve, the variable turbine geometry particularly allows for an improvement in response in the event of a positive load change, i.e. a load change in the direction of a higher load as occurs in a starting process for example.

Efforts are made in engine development to apply this advantage compared to a conventional exhaust-gas turbocharger having a bypass valve to spark-ignition engines as well. No exhaust-gas turbochargers having a variable turbine geometry are, as yet in mass production.

Due to their design, the currently used exhaust-gas turbochargers featuring bypass valves generally have the disadvantage that with the rigid turbine geometry they simultaneously must fulfill all requirements regarding the level of the charge air pressure to be set and the response at the various operating points of the internal combustion engine defined by rotational speed and load. Currently this is only possible by a compromise between the charge air pressure to be set and the response.

In contrast to exhaust-gas turbochargers that have a bypass valve, in exhaust-gas turbochargers featuring a variable turbine geometry, the problem lies in the optimal triggering of the variable turbine geometry. This is more complex than in the case of triggering a bypass valve and requires a new approach so as to utilize the optimal performance potential of the exhaust-gas turbocharger equipped with a variable turbine geometry.

SUMMARY OF THE INVENTION

The method according to the present invention for operating an internal combustion engine with an exhaust-gas turbocharger has the advantage that a characteristic of a trigger signal for triggering the actuator is specified as a function of time. In this manner, the charge air pressure buildup and hence the response of the exhaust-gas turbocharger can be substantially improved by a suitable time specification of the trigger signal.

It is especially advantageous if the time characteristic of the trigger signal is specified as a function of an operating point of the internal combustion engine. In this manner, the charge air pressure buildup and thus the response of the exhaust-gas turbocharger can also be optimized as a function of the operating point.

A further advantage is derived if the actuator is triggered directly by the trigger signal having the specified time characteristic. In this manner, a dynamic precontrol of the charge air pressure buildup can be achieved.

A further advantage results if the actuator is triggered by the output signal of a regulator, particularly for regulating the charge air pressure, and if the output signal of the regulator is influenced by the time characteristic of the trigger signal. In this manner, the trigger signal for achieving an optimized charge air pressure buildup can be integrated into an existing regulator structure. Thus the output signal of the regulator can be adjusted by the trigger signal with regard to an optimized charge air pressure buildup.

In the most simple case this can be done by limiting the output signal of the regulator by the time characteristic of the trigger signal.

Another simple and reliable adjustment of the output signal of the regulator with regard to an optimized charge air pressure buildup using the trigger signal can be achieved by limiting the output signal of the regulator by a specified range around the time characteristic of the trigger signal.

It is furthermore advantageous if the actuator is triggered by the trigger signal and additionally by the output signal of the regulator and/or by the signal of a precontrol. In this manner, it is also possible to harmonize various requirements with regard to the response of the exhaust-gas turbocharger and of the charge air pressure to be set.

This can be achieved in a particularly simple way in that the trigger signal and additionally the output signal of the regulator and/or the signal of the precontrol are superposed for triggering the actuator. With regard to equalizing undesired fluctuations of the actual value of the charge air pressure, it is possible to combine in this manner the advantages of the optionally used regulator with the advantages of a fast response of the exhaust-gas turbocharger by dynamic precontrol using the trigger signal and optionally by steady-state precontrol.

A particularly differentiated charge air pressure buildup can be achieved if the signals are superposed in a weighted manner.

It is especially advantageous in this case if the weighting is changed over time. In this manner, the influence of the different signals on the setting of the charge air pressure can also be changed over time and hence the charge air pressure buildup can be even better adjusted to the various requirements regarding the response of the exhaust-gas turbocharger and the charge air pressure to be set.

DETAILED DESCRIPTION

Figure 1:
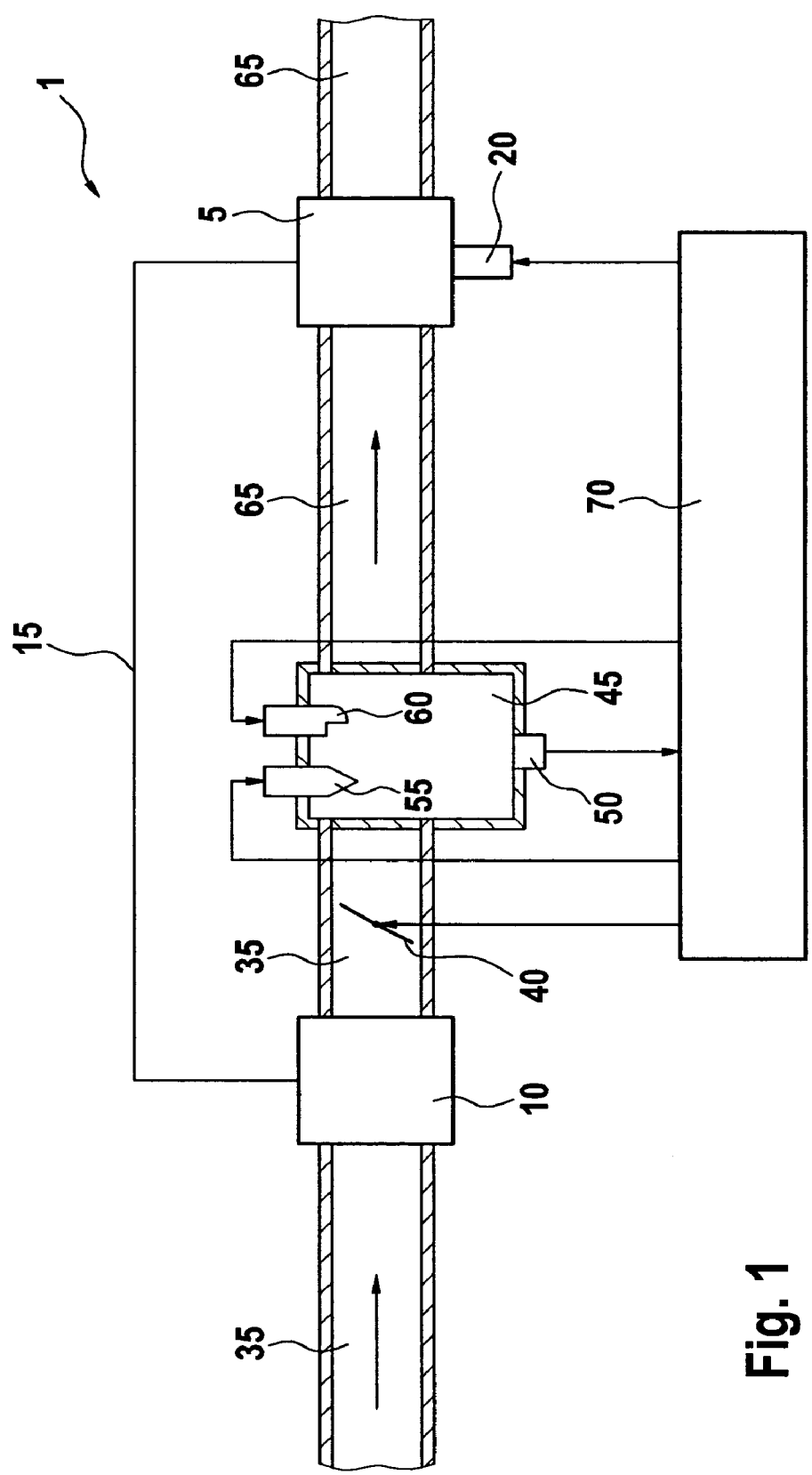
FIG. 1 shows a block diagram of an internal combustion engine.

In FIG. 1, reference numeral 1 designates an internal combustion engine. Internal combustion engine 1 drives a vehicle for example. Internal combustion engine 1 includes a combustion engine 45, which may take the form of a spark-ignition engine or a diesel engine, for instance. In the following, it is assumed by way of example that combustion engine 45 takes the form of a spark-ignition engine. Spark-ignition engine 45 is supplied with fresh air via an air supply 35. A compressor 10 of an exhaust-gas turbocharger is situated in air supply 35, which compresses the fresh air supplied to spark-ignition engine 45. The flow direction of the fresh air in air supply 35 is indicated in FIG. 1 by an arrow. Situated behind compressor 10 in the direction of flow of the fresh air in air supply 35 is a throttle valve 40, whose degree of opening is triggered by an engine control unit 70. This triggering occurs in a manner known to one skilled in the art in such a way, for example, as to implement a torque desired by the driver and specified using the accelerator pedal. Via an injection valve 55, fuel is injected directly into a combustion chamber of spark-ignition engine 45. Alternatively, the fuel injection can also take place in the section of air supply 35 referred to as an intake manifold between throttle valve 40 and an intake valve (not shown) of spark-ignition engine 45.

The injection quantity and/or the injection time of injection valve 55 is also specified by engine control unit 70 in a manner known to one skilled in the art, for example so as to maintain a specified oxygen content in the exhaust gas or a specified lambda value. The air/fuel mixture formed in the combustion chamber of spark-ignition engine 45 is ignited by a spark plug 60. For this purpose, the ignition firing point of spark plug 60 is likewise triggered by engine control unit 70 in a manner known to one skilled in the art, for example so as to set an optimal efficiency of combustion. For the sake of clarity, the example according to FIG. 1 shows a one-cylinder spark-ignition engine, even though spark-ignition engine 45 could just as well have multiple cylinders.

The exhaust gas formed in the combustion chamber of spark-ignition engine 45 in the combustion of the air/fuel mixture is expelled into an exhaust branch 65. The flow direction of the exhaust gas in exhaust branch 65 is likewise designated by an arrow in FIG. 1. A turbine 5 of the exhaust-gas turbocharger is situated in exhaust branch 65, which is driven by the exhaust-gas mass flow in exhaust branch 65 and which for its part drives, via a shaft 15 of the exhaust-gas turbocharger, compressor 10 for compressing the fresh air supplied to spark-ignition engine 45 via air supply 35. In the region of spark-ignition engine 45, an engine speed sensor 50 is located, which detects the rotational speed of spark-ignition engine 45 in a manner known to one skilled in the art and relays the measured value to engine control unit 70. Furthermore, an actuator 20 is provided, which is controlled by engine control unit 70 for influencing the charge air pressure generated by compressor 10 of the exhaust-gas turbocharger behind compressor 10 in the direction of flow of the fresh air. Actuator 20 may for example be a bypass valve in a bypass bypassing turbine 5 of the exhaust-gas turbocharger. In this example, however, it is to be assumed that actuator 20 changes a variable geometry of turbine 5 depending on the triggering by engine control unit 70. The use of a bypass valve as well as the use of an actuator for changing the variable geometry of the turbine are measures for influencing the charge air pressure that are already known to one skilled in the art. The control of actuator 20 by engine control unit 70 can occur via a regulator in a manner known to one skilled in the art, in which for example an actual value of the charge air pressure tracks a specified setpoint value.

The actual value of the charge air pressure may for example be detected by a charge air pressure sensor (not shown in FIG. 1) in the section of air supply 35 behind compressor 10 in the direction of flow of the fresh air and be supplied to engine control unit 70. The actual value of the charge air pressure, however, can also be modeled in a manner known to one skilled in the art from other performance quantities of internal combustion engine 1 such as, for example, the air mass flow of the fresh air supplied to spark-ignition engine 45 and the rotational speed of spark-ignition engine 45. The air mass flow in turn can be detected, for example, by an air-mass flow sensor (not shown in FIG. 1) in air supply 35 and communicated to engine control unit 70. The air-mass flow, however, can also be modeled in a manner known to one skilled in the art from other performance quantities of internal combustion engine 1. This modeling can occur in a manner known to one skilled in the art, for example, with the aid of the injected fuel quantity known in engine control unit 70 and a lambda value measured by a lambda probe (not shown in FIG. 1) in exhaust branch 65 between spark-ignition engine 45 and turbine 5 and relayed to engine control unit 70.

The setpoint value for the charge air pressure can be specified in a manner known to one skilled in the art as a function of the current operating point, for example, which is defined by the rotational speed of spark-ignition engine 45 and the engine load characterized by the fuel injection quantity. Additionally or alternatively to such a charge air pressure regulation, a steady-state precontrol may be provided by engine control unit 70, which triggers actuator 20 directly as a function of the current operating point for implementing the assigned setpoint value for the charge air pressure so that this can be set more quickly than in the case of a charge air pressure regulation. If both the charge air pressure regulation as well as the steady-state precontrol are provided, then on the one hand the setpoint value for the charge air pressure assigned to the current operating point of internal combustion engine 1 can be implemented more quickly than in a pure charge air pressure regulation and subsequent oscillations or fluctuations of the actual value of the charge air pressure can be corrected such that the actual value for the charge air pressure can be kept as constantly as possible at the designated setpoint value.

In the example described here, the charge air pressure is regulated by adjusting the guide vanes in turbine 5 and thus by modifying the turbine geometry using actuator 20. The rotational speed of shaft 15 changed in this manner generates a higher or lower charge air pressure on the side of compressor 10 and thus in air supply 35 behind compressor 10 in the direction of flow of the fresh air. Since, as described, a charge air pressure regulator normally does not provide the optimal performance potential in terms of dynamics, the charge air pressure buildup and thus the response of the exhaust-gas turbocharger and consequently the response of internal combustion engine 1 can be substantially improved by a suitable specification of the trigger signal of actuator 20, which is normally formed by a pulse-width modulated signal and is set by an appropriate pulse duty factor. The steady-state precontrol described above acts in this manner. Nevertheless, such a steady-state precontrol also does not have an optimal effect on the response of the exhaust-gas turbocharger.

The present invention therefore provides for the characteristic of the trigger signal for triggering actuator 20 to be specified as a function of time. For this purpose, the time characteristic of the trigger signal can be specified as a function of an operating point of internal combustion engine 1. As described, in this context the operating point is characterized, for example, by the rotational speed of spark-ignition engine 45 and the engine load, the engine load being characterized, for example, by the fuel injection quantity known in engine control unit 70. Via a characteristic curve or a characteristics map, it is thus possible to specify the trigger signal of actuator 20 as a function of time, for example, at an engine test bench or in a test run of the vehicle as a function of the operating point of internal combustion engine 1. The specification in this instance can occur in such a way that an optimal charge air pressure buildup is achieved. Here the charge air pressure buildup can be optimized particularly so as to achieve a response of the exhaust-gas turbocharger and thus of the internal combustion engine that is as quick as possible. In optimizing the charge air pressure buildup, it is possible also to take the protection of engine components into consideration, particularly to avoid charger pumping. Furthermore, aspects of the driveability of the vehicle can be taken into account in optimizing the charge air pressure buildup to ensure that the response of the exhaust-gas turbocharger and thus of the internal combustion engine is also as comfortable as possible for the driver of the vehicle and is not jerky for example.

The use of a characteristic curve is advantageous if the operating point of internal combustion engine 1 is to be defined only by one single performance quantity, for example by the engine rotational speed. In the case of more than one performance quantity for defining the current operating point of internal combustion engine 1, a characteristics map is required. It is also possible to use other performance quantities for characterizing the current operating point of internal combustion engine 1 in addition to the rotational speed of spark-injection engine 45 and the engine load. Thus for example the setpoint value for the charge air pressure to be set for a current engine rotational speed, i.e. the rotational speed of spark-injection engine 45, and a current engine load can also be used.

Figure 2:
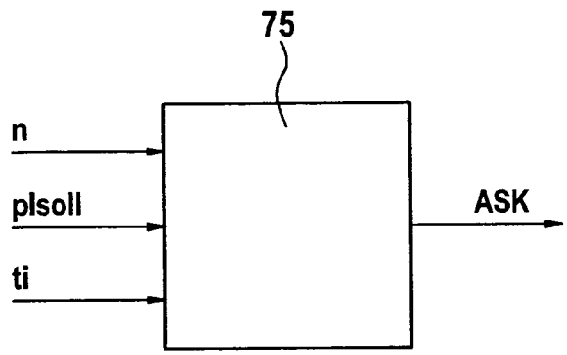
FIG. 2 shows a block diagram of a characteristics map for ascertaining a trigger signal for triggering an actuator of an exhaust-gas turbocharger.

In the form of a block diagram, FIG. 2 shows such a characteristics map 75 for ascertaining, as a function of the operating point, the trigger signal ASK for triggering actuator 20. The engine rotational speed n, the engine load characterized by the fuel injection quantity and the setpoint value plsoll for the charge air pressure are provided as performance quantities characterizing the current operating point of internal combustion engine 1. In FIG. 2, the fuel injection quantity is determined by the duration ti of the fuel injection per injection process.

Figure 3:
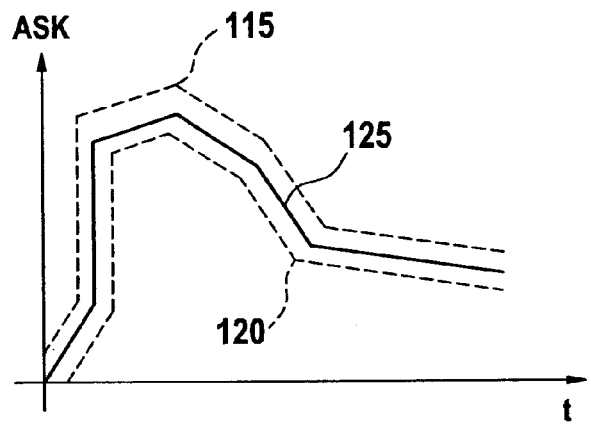
FIG. 3 shows a time characteristic of the trigger signal.

FIG. 3 shows an example for the time characteristic of the trigger signal ASK for triggering actuator 20. 125 indicates an exemplary time characteristic of trigger signal ASK. This time characteristic initially indicates a relatively steep rise and then falls off over time in a less steep manner to a value larger than zero. Such a time characteristic of trigger signal ASK for example is stored for an operating point of internal combustion engine 1 in characteristics map 75, which corresponds to a start operating state of internal combustion engine 1, in which normally the charge air pressure to be built up by the exhaust-gas turbocharger can only be provided in a delayed manner (the so-called turbo lag). By triggering actuator 20 using trigger signal ASK according to time characteristics 125 as shown in to FIG. 3, the turbo lag can be overcome more quickly by the relatively steep initial rise. In this manner, the response of the exhaust-gas turbocharger and thus of internal combustion engine 1 is accelerated significantly. The specification of the time characteristic of trigger signal ASK for triggering actuator 20 can thus be used to implement a dynamic precontrol, which further improves or optimizes the charge air pressure buildup, especially in dynamic operating situations of internal combustion engine 1 such as, for instance, a start operating state or an operating state of rapid load change such as e.g. an acceleration of the vehicle, via the charge air pressure buildup achievable with the aid of the charge air pressure regulation and/or the steady-state precontrol.

According to a first specific embodiment of the present invention, actuator 20 may be triggered exclusively by trigger signal ASK formed using characteristics map 75. For this purpose, characteristics map 75 provides for many different operating points of internal combustion engine 1 in each case an applied time characteristic of trigger signal ASK. Depending on the current operating point of internal combustion engine 1, the associated time characteristic of trigger signal ASK is read out from characteristics map 75 and used for triggering actuator 20. In the case of a current operating point of internal combustion engine 1 that has no time characteristic assigned to it in characteristics map 75, it is possible, by interpolation in consideration of neighboring operating points with their respectively assigned time characteristics of trigger signal ASK, to ascertain a suitable time characteristic of trigger signal ASK and use it for triggering actuator 20. In this manner, it is possible to ascertain a suitable time characteristic of trigger signal ASK for every operating point of internal combustion engine 1 and to implement a corresponding optimal time characteristic of the charge air pressure. Characteristics map 75 is stored in engine control unit 70.

Figure 4:
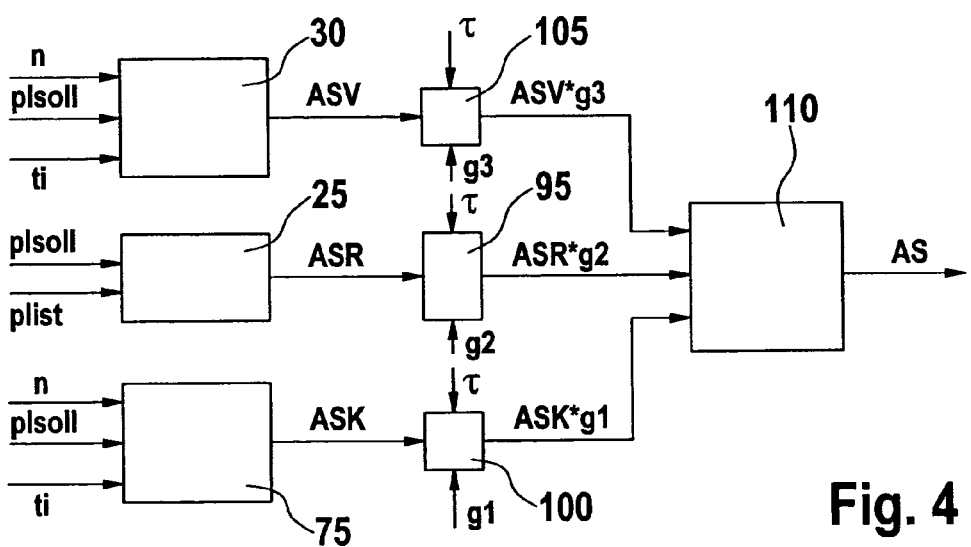
FIG. 4 shows a block diagram or a flow chart of a first specific embodiment for ascertaining a resulting trigger signal for the actuator.

According to a second specific embodiment in accordance with FIG. 4, trigger signal ASK of characteristics map 75 is used in addition to a charge air pressure regulator and a steady-state precontrol.

FIG. 4 shows a flow chart. Here, identical reference characters designate identical elements as in FIG. 2. The flow chart according to FIG. 4 may be implemented in engine control unit 70 as software and/or hardware. To this end, trigger signal ASK generated by characteristics map 75 is supplied to a first multiplication unit 100. In first multiplication unit 100, trigger signal ASK is multiplied by a first weighting factor g1. The resulting product ASK*g1 is supplied to a summation unit 110. In the following, trigger signal ASK of characteristics map 75 is referred to as a first trigger signal for the purpose of differentiation. The flow chart according to FIG. 4 further provides for a charge air pressure regulator 25, to which the setpoint value plsoll for the charge air pressure and the actual value plactual for the charge air pressure are supplied as input values. Charge air pressure regulator 25 then generates a second trigger signal ASR in such as way that actual value plactual of the charge air pressure is approximated to setpoint value plsoll of the charge air pressure. In a second multiplication unit 95, second trigger signal ASR is then multiplied by a second weighting factor g2. The resulting product ASK*g2 is supplied to summation unit 110. Further, a steady-state precontrol 30 is provided, which may likewise take the form of a characteristics map and which in this example is likewise supplied with engine speed n, setpoint value plsoll of the charge air pressure and engine load in the form of the duration ti of the fuel injection per injection process. In contrast to the dynamic precontrol using characteristics map 75, the steady-state precontrol using characteristics map 30 determines a trigger signal ASV that is steady-state, i.e. independent over time, as a function of the operating point of internal combustion engine 1. Characteristics map 30 of the steady-state precontrol may, for example, also be applied on an engine test bench or in driving tests in a suitable manner and one that is known to one skilled in the art.

In the following, the resulting trigger signal ASV is also referred to as the third trigger signal and is multiplied by a third weighting factor g3 in a third multiplication unit 105. The resulting product ASK*g3 is also supplied to summation unit 110. In summation unit 110, the outputs of the three multiplication units 95, 100, 105 are superposed in an additive manner. This results in trigger signal AS, which is finally used to trigger actuator 20. Weighting using weighting factors g1, g2, g3 is optionally provided and may alternatively also be omitted, i.e. weighting factors g1, g2, g3 would in the latter case all be chosen as equal to ⅓ so that an equal weighting would result. Weighting, however, allows for a more differentiated implementation of the charge air pressure buildup with the aid of the resulting trigger signal AS, it being possible to ascertain the weighting factors g1, g2, g3 likewise as a function of the current operating point of internal combustion engine 1 from in each case one characteristics map, these characteristics maps likewise being applicable on an engine test bench, for example, or in driving tests and not represented in FIG. 4 for the sake of clarity.

Thus, in a start operating state, for example, the dynamic precontrol can be weighted more strongly by first weighting factor g1 than the charge air pressure regulation and the steady-state precontrol so as to achieve a response of the exhaust-gas turbocharger that is as quick as possible. In a steady-state operating state of internal combustion engine 1, by contrast, the dynamic precontrol can be weighted more lightly by first weighting factor g1 than the charge air pressure regulation and the steady-state precontrol since a quick response is not required. The setting of weighting factors g1, g2, g3 as a function of the operating point is also optionally provided and not compulsory. As indicated in FIG. 4, there may be the further optional provision of subjecting weighting factors g1, g2, g3 to a change over time. If weighting factors g1, g2, g3 also feature a time-dependent characteristic, then the charge air pressure buildup can be implemented in an even more differentiated manner. The time dependence of the individual weighting factors g1, g2, g3 is indicated in FIG. 4 by the influence variable T. For this purpose, every weighting factor g1, g2, g3 may have a different time dependence. The time dependence of the individual weighting factors g1, g2, g3 may also be chosen as a function of the operating point of internal combustion engine 1 and may in each case be specified by one characteristics map for example. The corresponding characteristics maps are also not shown in FIG. 4 for the purpose of clarity.

Thus, in a start operating state, for example, there may be a provision initially to weight the dynamic precontrol by first weighting factor g1 more strongly and then to weight it more lightly over time. In this manner, it is possible to vary the weighting of the dynamic precontrol even during the start operating state such that in an initially stronger weighting the response of the exhaust—gas turbocharger during the start operating state is improved, while in the further course of the start operating state the charge air pressure regulation and the steady-state precontrol are weighted more strongly in comparison to the dynamic precontrol so as to stabilize the building-up process of the exhaust-gas turbocharger.

According to the above-described first exemplary embodiment according to FIG. 4, charge air pressure regulator 25 and steady-state precontrol 30 are provided in addition to the dynamic precontrol. Alternatively, however, it is also possible to provide in addition to the dynamic precontrol using characteristics map 75 only charge air pressure regulator 25 in the manner described or only the steady-state precontrol using characteristics map 30 in the manner described. Furthermore, as an alternative to the above-described first specific embodiment according to FIG. 4, it is possible to provide only some of the weighting factors g1, g2, g3 as a function of the operating point. Furthermore, as an alternative to the above-described first specific embodiment according to FIG. 4, it is possible to provide only some of the weighting factors g1, g2, g3 as a function of time. Furthermore, as an alternative to the above-described first specific embodiment according to FIG. 4, it is possible that the time dependence of weighting factors g1, g2, g3 or of some of the three weighting factors g1, g2, g3 is not provided as a function of the operating point.

Figure 5:
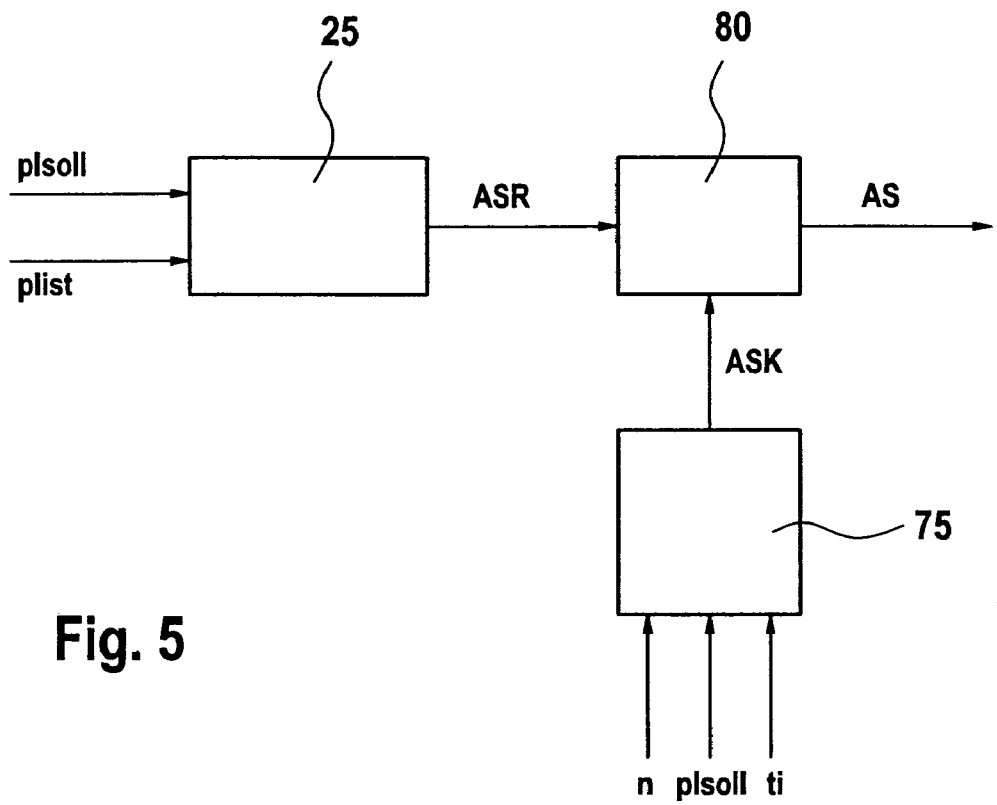
FIG. 5 shows a flow chart of a second specific embodiment for ascertaining a resulting trigger signal for the actuator.

FIG. 5 shows a flow chart of a second specific embodiment of the present invention. The flow chart according to FIG. 5 may also be implemented in engine control unit 70 as software and/or hardware. According to the flow chart in FIG. 5, in which identical reference characters designate identical elements as in the previous figures, charge air pressure regulator 25 is again provided, which generates the above-described second trigger signal ASR in the sense of a quantitative minimization of the difference between the setpoint value plsoll of the charge air pressure and the actual value plactual of the charge air pressure. Second control signal ASR is supplied to a first limiter 80. First limiter 80 is also supplied with first control signal ASK as output signal of characteristics map 75 of the dynamic precontrol, which is formed as a function of the operating point of internal combustion engine 1, which in the second exemplary embodiment according to FIG. 5 is likewise defined by engine speed n, setpoint value plsoll of the charge air pressure and the engine load, characterized by duration ti of the fuel injection per injection process. In this instance, depending on the operating point, first trigger signal ASK has the time characteristic 125 according to FIG. 3 for example. Thus second trigger signal ASR of charge air pressure regulator 25 is limited by first trigger signal ASK of characteristics map 75 in first limiter 80. In this example, second trigger signal ASR can be limited in the upward direction by first trigger signal ASK so as to avoid undesired charger pumping. Thus the resulting trigger signal AS at the output of first limiter 80 corresponds to the second trigger signal ASR, when this is smaller or equal to first trigger signal ASK, while otherwise it corresponds to first trigger signal ASK. In this manner, second trigger signal ASR as output signal of charge air pressure regulator 25 is influenced by the time characteristic of first trigger signal ASK, in this specific embodiment, in a restricting or limiting manner.

Figure 6:
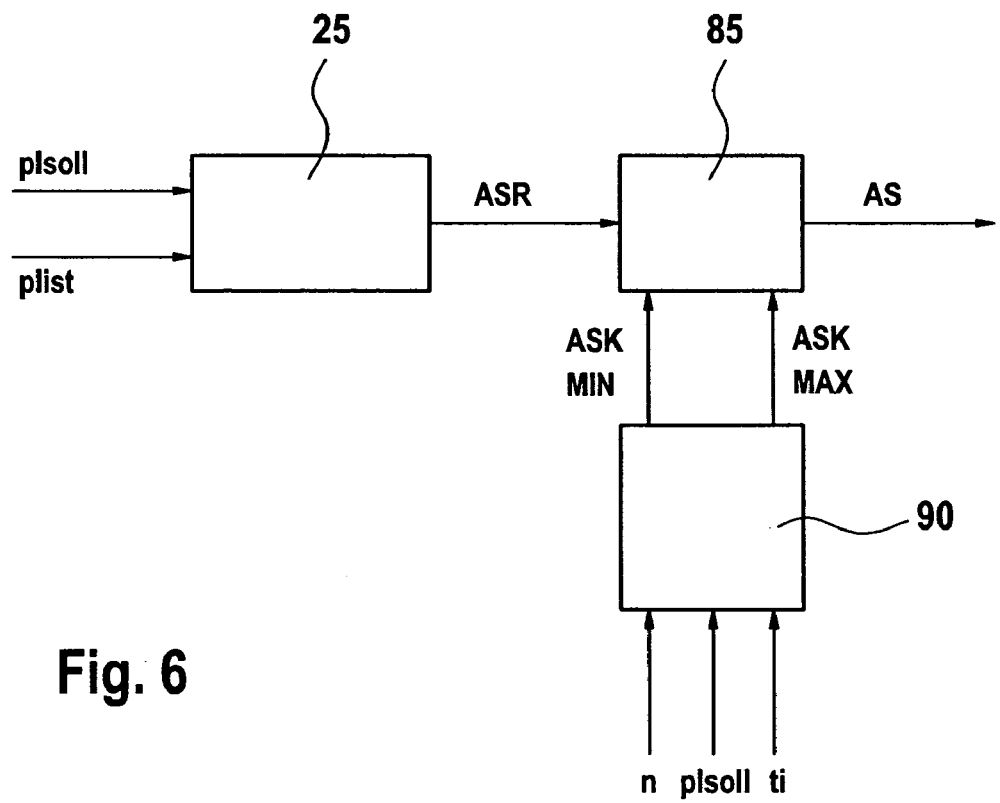
FIG. 6 shows a flow chart of a third specific embodiment for ascertaining a resulting trigger signal for the actuator.

FIG. 6 shows a flow chart of a third specific embodiment of the present invention. The flow chart according to FIG. 6 may also be implemented in engine control unit 70 as software and/or hardware. According to the flow chart in FIG. 6, in which identical reference characters designate identical elements as in the previous figures, charge air pressure regulator 25 is again provided, which generates the above-described second trigger signal ASR in the sense of a quantitative minimization of the difference between the setpoint value plsoll of the charge air pressure and the actual value plactual of the charge air pressure. Second trigger signal ASR is supplied to a second limiter 85. Second limiter 85 is additionally supplied with a minimum value ASKMIN and a maximum value ASKMAX each from a third characteristics map 90.

As a function of the operating point of internal combustion engine 1, defined in this example by engine speed n, third characteristics map 90 provides the setpoint value plsoll of the charge air pressure and the engine load, characterized by the duration ti of the fuel injection per injection process, a maximum time characteristic 115 and a minimum time characteristic 120 for the trigger signal of actuator 20. Here maximum time characteristic 115 and minimum time characteristic 120 define an admissible range for the time characteristic of the trigger signal of actuator 20 around an optimal time characteristic, which corresponds to the above-described first trigger signal ASK and is indicated in FIG. 3 by reference number 125. This being the case, third characteristics map 90 can be applied for the dynamic precontrol in analogy to first characteristics map 75 in that maximum time characteristic 115 and minimum time characteristic 120 are formed starting from optimal time characteristic 125. For this purpose, the distance of maximum time characteristic 115 from optimal time characteristic 125 and the distance of minimum time characteristic 120 from optimal time characteristic 125 can each be ascertained as a function of the operating point, i.e. in this example again as a function of engine speed n, the setpoint value plsoll of the charge air pressure and the engine load, characterized by the duration ti of the fuel injection per injection process, and can be stored in third characteristics map 90. Alternatively, there may be a provision for specifying the distance of maximum time characteristic 115 from optimal time characteristic 125 and/or the distance of minimum time characteristic 120 from optimal time characteristic 125 each in a fixed manner.

Minimum value ASKMIN thus corresponds to minimum time characteristic 120 and maximum value ASKMAX corresponds to maximum time characteristic 115. Due to minimum time characteristic 120 and maximum time characteristic 115, second trigger signal ASR is now limited, as output signal of charge air pressure regulator 25, by second limiter 85. This means that resulting trigger signal AS at the output of second limiter 85 corresponds to second trigger signal ASR, if second trigger signal ASR is larger than or equal to minimum time characteristic 120 and smaller than or equal to maximum time characteristic 115 in the current operating point of internal combustion engine 1. On the other hand, if second trigger signal ASR lies below minimum time characteristic 120 in the current operating point of internal combustion engine 1, then resulting trigger signal AS for triggering actuator 20 corresponds to minimum time characteristic 120.

On the other hand, if second trigger signal ASR lies above maximum time characteristic 115 in the current operating point of internal combustion engine 1, then resulting trigger signal AS for triggering actuator 20 corresponds to maximum time characteristic 115. This ensures that resulting trigger signal AS in the current operating point of internal combustion engine 1 lies within the range around optimal time characteristic 125 that is defined by minimum time characteristic 120 and maximum time characteristic 115. This also ensures a largely optimized charge air pressure buildup.

Optimal time characteristic 125 for the trigger signal of actuator 20 can be ascertained on an engine test bench or in driving tests by bringing the actual value for an efficiency of the exhaust-gas turbocharger as close as possible to an experimentally ascertained optimal value in the current operating point of internal combustion engine 1. In the experimental optimization of the efficiency of the exhaust-gas turbocharger, among other things, the pent-up exhaust-gas back pressure in the direction of flow of the exhaust gas in front of and behind turbine 5, the exhaust-gas mass flow, the rotational speed of shaft 15 and the exhaust-gas temperature must be taken into consideration. For these variables have a substantial influence on the efficiency of the exhaust-gas turbocharger.

The method according to the present invention may be used, for example, for pure testing purposes, for example in order to investigate the operation of an exhaust-gas turbocharger having a variable turbine geometry, its design or dimension and its feedback effect on spark-ignition engine 45. The method according to the present invention can furthermore be employed to utilize the optimal time characteristics of the trigger signal of actuator 20 ascertained during the application, for example, in accordance with one of the described specific embodiments as a function of the operating point within the framework of the dynamic precontrol for triggering actuator 20. For this purpose, actuator 20 may be triggered, for example, using a suitably chosen pulse trigger factor for implementing the resulting trigger signal. In this context, instead of the optimal time characteristics of the trigger signal, it is also possible to store the suitable assigned pulse trigger factor in characteristics maps 75, 90 and to retrieve and use it when required depending on the operating point of internal combustion engine 1 for triggering actuator 20.

There may be a further provision to use the described dynamic precontrol only in certain operating ranges or ranges of the engine load of internal combustion engine 1 and not as described above generally in all possible operating points of internal combustion engine 1. Thus to use the dynamic precontrol, a check must first be performed to determine whether internal combustion engine 1 is operated in an operating range in which the dynamic precontrol is admissible. If this is the case, the dynamic precontrol will be activated for example within the framework of one of the above-described exemplary embodiments, and otherwise the charge air pressure will be set in the conventional manner independently of the dynamic precontrol, for example using the charge air pressure regulator and/or the steady-state precontrol. In the case of the first specific embodiments, for example, the dynamic precontrol can be activated by selecting first weighting factor g1 to be unequal to zero. In the case of the second exemplary embodiment according to FIG. 5 and the third exemplary embodiment according to FIG. 6, the activation of the dynamic precontrol for limiting the output signal of charge air pressure regulator 25 can occur, for example, by switching an infinitely high or an infinitely low limiting value to the output of first characteristics map 75 or the outputs of third characteristics map 90. This switching then occurs in first limiter 80 or in second limiter 85 using software or hardware.

For deactivating the dynamic precontrol in operating ranges of internal combustion engine 1, in which the dynamic precontrol is to be inadmissible, it is possible to set first weighting factor g1 to zero in the first specific embodiment according to FIG. 4, for example, while in the second specific embodiment according to FIG. 5 and in the third specific embodiment according to FIG. 6 accordingly switching to the infinitely high or infinitely low limiting values. In this context, infinitely high or infinitely low limiting values signify the absence of a limitation.

The method according to the present invention can also be applied to other types of internal combustion engines equipped with an exhaust-gas turbocharger. Thus it can also be applied to diesel engines for example. Likewise it can be used in a corresponding manner also for exhaust-gas turbochargers, for example, in which the charge air pressure is influenced with the aid of a bypass valve in a bypass of the turbine or of the compressor of the exhaust-gas turbocharger.

What is claimed is:

1. A method for operating an internal combustion engine having an exhaust-gas turbocharger, the method comprising:
   triggering an actuator for influencing a charge air pressure generated by a compressor of the exhaust-gas turbocharger; and
   specifying a time curve of a trigger signal for triggering the actuator, wherein the time curve of the trigger signal includes at least two signal values different from zero, and wherein the time characteristic of the trigger signal is specified as a function of an operating point of the internal combustion engine, using one of a characteristic curve and a characteristics map.

2. The method according to claim 1, wherein the actuator is triggered directly by the trigger signal having the specified time characteristic.

3. The method according to claim 1, wherein the actuator is triggered by an output signal of a regulator, for regulating the charge air pressure, and the output signal of the regulator is influenced by the time characteristic of the trigger signal.

4. The method according to claim 3, further comprising limiting the output signal of the regulator by the time characteristic of the trigger signal.

5. The method according to claim 3, further comprising limiting the output signal of the regulator by a specified range around the time characteristic of the trigger signal.

6. The method according to claim 3, wherein the actuator is triggered by the trigger signal and additionally by at least one of the output signal of the regulator and a signal of a precontrol.

7. The method according to claim 6, further comprising superposing the trigger signal and additionally the at least one of the output signal of the regulator and the signal of the precontrol for triggering the actuator.

8. The method according to claim 7, wherein the signals are superposed in a weighted manner.

9. The method according to claim 8, wherein the weighting is changed over time.

* * * * *